(12) United States Patent
Johnson et al.

(10) Patent No.: US 6,551,455 B2
(45) Date of Patent: Apr. 22, 2003

(54) MULTI-LAYER PRINTABLE WEAR RESISTANT PAPERS INCLUDING PARTICLE RICH INTERIOR LAYER

(75) Inventors: Mark A. Johnson, Chillicothe, OH (US); John Benson, Lee, MA (US); Mahendra Mehta, Pittsfield, MA (US); Steve Canary, Westfield, MA (US); Eric Girardin, Westfield, MA (US)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 09/955,447

(22) Filed: Nov. 8, 2001

(65) Prior Publication Data

US 2002/0117277 A1 Aug. 29, 2002

Related U.S. Application Data

(63) Continuation-in-part of application No. 09/794,426, filed on Feb. 27, 2001, now abandoned.

(51) Int. Cl.$^7$ .......................... D21F 11/04; D21H 19/64
(52) U.S. Cl. ...................... 162/128; 162/186; 428/908.8
(58) Field of Search ................... 162/111, 112, 162/123, 124, 125, 127, 128, 157.6, 158, 166, 181.1, 181.2, 181.4, 181.5, 183, 184, 185, 186, 298, 299, 300; 428/143, 148, 203, 204, 205, 206, 208, 211, 323, 327, 328, 329, 908.8; 427/411, 415, 419.2, 420; 118/DIG. 4

(56) References Cited

U.S. PATENT DOCUMENTS

| | | | |
|---|---|---|---|
| 1,707,333 A | 4/1929 | Traquair | 162/128 |
| 1,914,526 A | 6/1933 | Rafter | 162/127 |
| 2,468,853 A * | 5/1949 | Williamson | 162/124 |
| 2,816,851 A | 12/1957 | Arledter | 428/211 |
| 3,798,111 A | 3/1974 | Lane et al. | 428/219 |
| 3,928,706 A | 12/1975 | Gibbons | 428/323 |
| 4,006,048 A | 2/1977 | Cannady, Jr. et al. | 156/90 |
| 4,008,121 A * | 2/1977 | Coleman | 162/124 |
| 4,034,134 A | 7/1977 | Gregorian et al. | 428/86 |
| 4,044,185 A | 8/1977 | McCaskey, Jr. et al. | 428/153 |
| RE30,233 E * | 3/1980 | Lane et al. | 156/277 |
| 4,263,081 A * | 4/1981 | Scher et al. | 156/222 |
| 4,288,491 A | 9/1981 | Surzhenko et al. | 428/332 |
| 4,713,138 A | 12/1987 | Ungar et al. | 156/307.4 |
| 4,734,336 A | 3/1988 | Oliver et al. | 428/537.5 |
| 4,971,855 A | 11/1990 | Lex et al. | 428/206 |
| 5,011,575 A * | 4/1991 | Keller | 162/299 |
| 5,039,378 A * | 8/1991 | Pommier et al. | 162/128 |
| 5,141,799 A * | 8/1992 | Mehta et al. | 162/134 |
| 5,188,876 A | 2/1993 | Hensel et al. | 428/76 |
| 5,268,204 A | 12/1993 | Hill et al. | 428/393 |
| 5,288,540 A | 2/1994 | Albrinck et al. | 428/208 |
| 5,344,704 A | 9/1994 | O'Dell et al. | 428/323 |
| 5,365,951 A | 11/1994 | Arterbery et al. | 131/339 |
| 5,456,949 A | 10/1995 | Albrinck et al. | 427/411 |

(List continued on next page.)

FOREIGN PATENT DOCUMENTS

| DE | 19735189 | 4/1999 |
|---|---|---|
| EP | 0555993 | 8/1993 |
| EP | 1026008 | 9/2000 |
| WO | 99/09274 | 2/1999 |
| WO | 01/57315 | 8/2001 |

Primary Examiner—Steven P. Griffin
Assistant Examiner—Eric Hug
(74) Attorney, Agent, or Firm—Thomas Hine LLP

(57) ABSTRACT

A process for forming an abrasion resistant, printable sheet which comprises forming a web of cellulosic fibers on a papermaking machine and applying a slurry including an abrasion-resistant grit to the upper surface of the web on the papermaking machine and then applying a secondary web of cellulosic fibers over the grit to form a three layer overlay product.

12 Claims, 2 Drawing Sheets

U.S. PATENT DOCUMENTS

| | | |
|---|---|---|
| 5,486,410 A | 1/1996 | Groeger et al. ............. 442/353 |
| 5,545,476 A | 8/1996 | O'Dell et al. ............... 428/327 |
| 5,558,906 A | 9/1996 | Albrinck et al. ............ 427/180 |
| 5,565,011 A | 10/1996 | Follett et al. .................. 51/297 |
| 5,605,746 A | 2/1997 | Groeger et al. ............. 442/347 |
| 5,622,190 A | 4/1997 | Arterbery et al. ........... 131/339 |
| 5,820,937 A | 10/1998 | Crabtree et al. ............ 427/420 |
| 5,962,134 A * | 10/1999 | Shah et al. ............... 427/213.3 |
| 6,051,193 A * | 4/2000 | Langer et al. .............. 422/179 |
| 6,093,473 A | 7/2000 | Min ........................... 428/147 |
| 6,290,815 B1 * | 9/2001 | Magnin et al. ............. 162/158 |

* cited by examiner ns of the present invention.
MULTI-LAYER PRINTABLE WEAR RESISTANT PAPERS INCLUDING PARTICLE RICH INTERIOR LAYER

CROSS REFERENCE TO RELATED APPLICATIONS

This application is a continuation-in-part of U.S. Ser. No. 09/794,4206 filed Feb. 27, 2001 now abandoned.

BACKGROUND OF THE INVENTION

The present invention relates to wear resistant overlays for use in decorative laminates and floorings and to laminates and flooring prepared therefrom. Decorative laminates have been conventionally made by stacking a plurality of layers of paper impregnated with synthetic thermosetting resins. Normally, the assembly consists of a plurality (for example, three to eight) core sheets made from phenolic resin impregnated Kraft paper, above which lies a decor sheet, usually a print or solid color, impregnated with melamine resin. An overlay sheet is often provided on top of the decor sheet which, in the laminate, is made to be as transparent and as wear-resistant as possible thereby allowing the decor sheet to be seen through the overlay while providing protection for the decor sheet from being damaged by scratches and scuffs. This additional decor sheet, while adding the desired decorative aspects, of course adds to the complexity and cost of the finished laminate.

The overlay sheet, also known as a WROL, can be formed in a multitude of different ways. One conventional manner for forming a suitable WROL comprises forming a sheet of cellulose fibers having a very low basis weight which carries therein and thereon abrasion resistant particles. Conventionally, the cellulose fibers are deposited on the papermachine wire from a first headbox and overcoated with a slurry of mineral particles, such as aluminum oxide, which are deposited from a secondary headbox located relatively closely thereto. The slurry of mineral particles cascades over and through the cellulose fibers thereby causing many of the mineral particles to become embedded in the overlay, as opposed to concentrated near the top of the overlay, where they would be more effective in preventing abrasion to the decor sheet. Additionally, much of the mineral particle slurry does not adhere to the paper and falls to the floor resulting in a waste of materials as well as presenting a cleanliness issue. Addition of the mineral particles in a slurry in this manner is fairly conventional and is generally considered to be a "wet end" addition since the grit is applied on the end of the wire prior to the paper being dried.

There have, however, been recent improvements in this method. For example, U.S. Pat. No. 5,820,937 to Crabtree et al., herein incorporated by reference, discloses a similar method except that instead of just dumping the slurry on the paper web using a headbox, the particle slurry is deposited more efficiently using a slot orifice coater such as a curtain coater. But while this method has solved some of the prior art problems (conservation of water, cleanliness issues, waste of materials), some other problems remain unresolved. In particular, while the addition of grit directly to the top of the paper while it is on the wire has been found to improve the abrasion and scuff resistant properties of the end-product laminates, problems have been encountered in attempting to keep the grit particles attached to the top of the paper. Of course, any grit "fall-off" that occurs during processing generally results in the decreased abrasion resistance of the overall product. Furthermore, while the addition of a single layer of grit to the WROLs produces improved abrasion resistance over prior art laminates not utilizing grit addition at all, additional abrasion resistance is always desired, especially for laminates to be used in flooring, countertops, etc.

The "fall-off" problem discussed herein has been addressed to a certain extent in the past. Specifically, U.S. Pat. No. 4,263,081 to Scher et al. discloses adding microcrystalline cellulose either over the top or underneath the grit to "bind" the grit to the paper fibers. The use of microcrystalline cellulose as disclosed in the Scher et al. patent helps to prevent grit migration and fall-off. And while the method described in Scher et al. has proved to be somewhat successful in alleviating some of the above note problems, the use of microcrystalline cellulose by itself has not completely eliminated fall-off problems. Additionally, the extra abrasion resistance provided by the use of microcrystalline cellulose as a binder is relatively negligible.

Accordingly, it would be desirable to have a process for producing wear resistant papers useful for incorporation into decorative laminates that reduce "fall-off" problems associated with the addition of grit particles to a negligible level such that decreased abrasion resistance of the finished paper and loss of grit particles are alleviated. Additionally, it would be desirable to have such a process which accomplished this goal while increasing the overall abrasion resistance of the finished papers. Furthermore, it would be desirable to have such a process which produces finished papers relatively cheaply and efficiently and wherein papers produced using such a process would do minimal damage to the process equipment by which such papers were made. Additionally, it would be desirable to have such a process which produces wear resistant papers having the capability of being printed or coated on one side thereof, such capability allowing for the elimination of unnecessary and expensive decor sheets from laminates made incorporating the wear resistant papers. Finally, it would be desirable to produce improved wear resistant papers as described herein that are capable of being directly printed on at least one side thereof, wherein the abrasion resistance of the finished laminate is improved, and wherein the visual properties of the papers, and the finished laminates incorporating the wear resistant papers, such as streaking and clarity are improved or not significantly detrimentally affected.

SUMMARY OF THE INVENTION

In accordance with the present invention, an improved wear resistant overlay paper is provided for incorporation into a decorative laminate that may be printed on directly, wherein the overall abrasion resistance of the finished laminate is improved and the visual properties (streaking and clarity) are improved or not significantly detrimentally affected. More specifically, the present invention provides a heretofore unknown wear resistant paper composition comprising multiple paper fiber layers with a mineral particle, or grit, rich interior layer. In one embodiment, the additional fiber layer may be added to the paper by mixing fiber directly with grit slurry and adding the mixture to the base paper layer through a secondary headbox. In a preferred embodiment, the "top" or "felt-side" fiber layer is a discrete layer that is added over the top of a particle rich interior layer after the grit slurry has been applied to the base paper. In this embodiment, the grit is preferably applied using a curtain or slot orifice coater and the secondary fiber layer is added using a secondary headbox. The addition of the discrete feltside fiber layer provides a smooth surface that may be printed or coated on directly after the forming and drying of the paper and that helps prevent grit migration or "fall off"

from the wear resistant paper while maintaining or improving the visual properties of the finished laminate incorporating the improved wear resistant paper of the present invention.

As mentioned above, in a preferred embodiment of the present invention, the grit is added to the paper using a curtain or slot orifice coater to improve the retention of the grit on the paper, lower processing costs, and improve the overall quality of the produced wear resistant paper. The addition of grit to wear resistant paper in a manner consistent with a preferred embodiment of the present invention is disclosed in U.S. Pat. No. 5,820,937, the contents of which are herein incorporated by reference.

In yet another preferred embodiment of the present invention, standard aluminum oxide grit is mixed with or replaced by grit, such as aluminum oxide particles, that have been encapsulated in a phenoplast or aminoplast resin. The use of such encapsulated grit provides a finished laminate having the desired abrasion resistant properties while helping to prevent unnecessary wear and tear on papermaking process machinery. The production of suitable encapsulated particles that would be operable for incorporation in the present invention are discussed in U.S. Pat. No. 5,962,134, the contents of which are herein incorporated by reference.

Other objects and advantages will be apparent from the following description, the drawings and the appended claims.

DETAILED DESCRIPTION OF THE INVENTION

Figure 1:
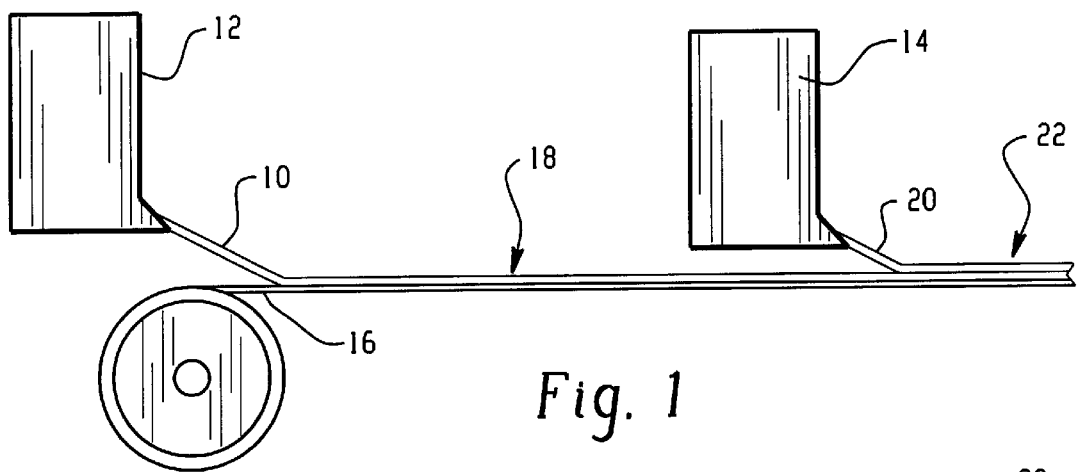
FIG. 1 is a schematic diagram of a papermaking process for use in accordance with an embodiment of the method of the present invention wherein a grit/fiber slurry is deposited on the base paper web through a secondary headbox.

Initially, it is noted with respect to the advantageous printing and coating aspects provided by the present invention that while although most known contact and non-contact printing and coating methods could potentially be employed to achieve the desired image on the paper disclosed herein, non-contact methods (such as ink jet printing, curtain coating, spray coating, electrostatic coating, etc.) are deemed to give the best results. This is because the high degree of inorganic particulate matter present in the middle layer of the paper claimed and disclosed herein results in relatively rough, uneven paper surfaces. As such, contact coating and printing methods (such as letter press) sometimes have difficulties producing a desired decor. Furthermore, the inorganic particulate matter from the paper can be attracted to or attached to the physical components of the contact printer or coater thereby fouling the components and degrading print quality. For these reasons, contact printing and coating methods are not considered to be the most desirable methods for use in connection with the paper of the present invention. It is noted, however, that despite the undesirable characteristics of contact printing methods discussed herein, in some instances the decor created by the use thereof or for other production reasons, the use of contact printing or coating methods may be deemed necessary or even desirable. As such the use of contact and non-contact coating and printing methods, as well as any other coating or printing methods currently in use or yet to be developed, with the paper disclosed herein are all considered to be within the scope of the present invention.

With respect to all of the embodiments of the invention disclosed herein, the grit employed in the present invention can be a mineral particle such as silica, alumina, alundum, corundum, emery, spinel, as well as other materials such as tungsten carbide, zirconium boride, titanium nitride, tantalum carbide, beryllium carbide, silicon carbide, aluminum boride, boron carbide, diamond dust, and mixtures thereof. The suitability of the particular grit will depend on several factors such as availability, cost, particle size distribution and even the color of the particles. Considering cost availability, hardness, particle size availability and lack of color, aluminum oxide is generally the preferred grit for most applications. End use performance dictates the basis weight, ash loading, size and type of grit particles. The grit preferably has an average particle size of about 10 to 100 microns and a particle size distribution of about 10 to 150 microns.

Further, if micro-encapsulated grit is to be used in accordance with the present invention as disclosed above, the micro-encapsulation coating may be any suitable polymeric coating but is preferably an aminoplast or phenoplast resin. Furthermore, the micro-encapsulation of the particles may be accomplished by many of the micro-encapsulation methods known in the art including the following: injection treatment coating wherein particles in a shear zone are spray-coated; fluid bed coating, including Wurster & related coating processes, wherein the grit is spray coated in a fluid bed of particles; conventional spray drying wherein the coating particles are mixed and atomized under heat; dry-on-dry coating wherein an impact mill is used to mix a ratio of 10× size core with 1× size coating particles; MAIC coating process wherein a magnetic field is used to assist the impaction coating process using vibrating screens that impact and screen particles during dry-on-dry coating thereby separating out coated from uncoated particles in a tower; vapor deposition coating wherein the particles to be coated are tumbled in a free radical pyrolysis zone; spinning-disc coating wherein the particles are released from the edges of a spinning film coater with polymer solution into a drying tower; spray chilling coating wherein a PEO/Wax melt coating is applied to particles at 100% solids; extrusion encapsulation wherein the coating is pumped through concentric tubes (outer) and particle (inner) through a concentric nozzle into a curing bath; spray congealing coating wherein the particles and coating are sprayed into in a hardening bath; interfacial condensation wherein the particles are activated with a coupling agent and are slurried in a reactive polymer or monomer; and coacervation coating wherein the polymer and particles are mixed in a slurry, after which the liquid is evaporated wherein the process is improved by coacervate precipitation with polymer of opposite charge or other insolubilization method. Additionally, as mentioned above, the micro-encapsulation method described fully in U.S. Pat. No. 5,962,134 to Shah et al.

would be operative in the present invention. Of course other micro-encapsulation methods known in the art and not specifically discussed herein would also be operable and are considered within the scope of the present invention.

For the slot orifice coater addition embodiment disclosed herein, the grit slurry employed in accordance with the present invention will typically include a binder material. The binder material may be any of the commonly used binders such as melamine resins, polyvinyl alcohol, acrylic latex, starch, casein, styrene-butadiene latex, carboxymethyl cellulose (CMC), microcrystalline cellulose, sodium alginate, etc., or mixtures thereof which are used in coating compositions where the coating material is to be bonded to a substrate such as a decor sheet or overlay sheet. Melamine resins such as melamine-formaldehyde are advantageously used as the binder material in the present invention since the melamine-formaldehyde resin is also commonly used to saturate the decor sheet. The binder is usually employed in an amount of about 1 to 10% by weight of coating solids. It is noted that when the micro-encapsulated grit coating is from a headbox, either primary or secondary, no binder is usually used.

When the grit, either standard or micro-encapsulated, is added through the primary or secondary headbox, solid composition (by weight) of the slurry is preferably between 0.5 and 5%, and more specifically, generally between 1 and 2%. When the grit is added using a slot orifice coater, the grit slurry medium can contain about 5 to 95% and, preferably, about 10 to 80% grit by weight. As such, the slurry preferably has a viscosity of about 50 to 150 cps when coating from a bead-type slot orifice coater and about 50 to 500 cps when coating form a curtain-type slot orifice coater. For curtain coating, the slurry preferably also includes a small amount of a surfactant (0.05 to 0.5%).

For all embodiments of the invention disclosed herein wherein the finished product is an overlay sheet, the base sheet is preferably formed from fibers conventionally used for such purpose and, preferably, is a bleached kraft pulp. The pulp may consist of hardwoods or softwoods or a mixture of hardwoods and softwoods which is normally preferred. Higher alpha cellulose such as cotton may be added to enhance certain characteristics such as post-formability. The basis weight of the uncoated overlay sheet may range from about 10 to 40 pounds per 3000 square feet, and preferably about 15 to 40 pounds per 3000 square feet. As mentioned above, microcrystalline cellulose may be added to either the grit slurry or the paper slurry to operate as a binder as is known in the art. Further, a layer of microcrystalline cellulose may be added as a discrete layer in between any of the layers disclosed herein to improve the clarity and abrasion resistant properties of the completed wear resistant overlay papers disclosed herein.

In the embodiment described herein where a slurry of grit and fiber is added to the base paper through a secondary headbox, the composition of the slurry may be any operable composition and may be as follows: about 4.7 grams/liter fiber, about 3.8 grams/liter aluminum oxide, and about 991.5/grams/liter water. In the embodiment described herein wherein a discrete top or "felt-side" fiber layer is deposited over grit that has previously been applied to the base paper, the composition of the fiber slurry be any operable composition and may be as follows: about 4.7 grams/liter fiber and about 995 grams/liter water. If a slot orifice coater is used to deposit the grit slurry onto the paper web, the composition of the slurry may be any operable composition and may be as follows (in weight percentages): about 83.4% water, about 15% grit particles, about 1.5% microcrystalline cellulose, about 0.15% carboxymethylcellulose wherein the target solids mixture may be about 15% and may range from about 1% to 50%. In any of these embodiments, the grit may be encapsulated, non-encapsulated or a mixture of both.

It is generally desired that the finished laminate made using an overlay or decor sheet made by the methods of the present invention have abrasion values of between 1,500 to 20,000 cycles (NEMA: LD3.13). These desired abrasion values can be achieved by selecting the grit, the micro-encapsulation resin (if such is used), the base stock, the saturation resin, etc. as is known in the art.

As best shown in FIG. 1, one preferred method for producing paper for use in wear-resistant laminates in accordance with the present invention involves using only two headboxes, a primary headbox 12 and a secondary headbox 14. In this embodiment, the paper slurry 10 is initially deposited on the wire 16 through the primary headbox 12 to form the base paper 18 as is known in the art. Next, a slurry of grit and fiber 20 of a composition as described above is deposited on the base paper 10 to form a wear resistant overlay paper 22 in accordance with the present invention. It is noted that while this addition occurs at the "wet end" of the paper machine before the dryers, it is preferred that the secondary headbox 14 be positioned as far from the primary headbox 12 as possible in order to help insure that the grit/fiber slurry 20 forms a discrete layer on top of the base paper 18. After the grit/fiber slurry 20 is deposited on the base paper 18, the wear resistant overlay 22 is dried and prepared for shipping as is known in the art. At this point in time, if desired, the wear resistant overlay 22 may be subjected to an otherwise standard printing or coating process (not shown) to print a desired decor on the paper thereby eliminating the need for the decor sheet in the finished laminate.

Figure 2:
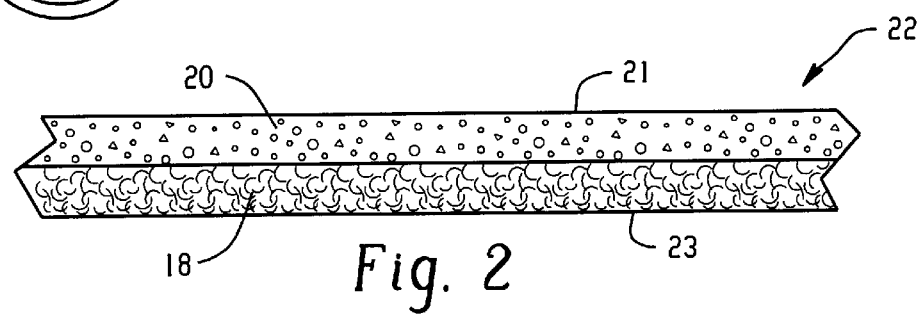
FIG. 2 is a cross-sectional view of a wear resistant overlay paper made using the method shown in FIG. 1.

As best shown in FIG. 2, the wear resistant overlay 22 as produced above may have a top side 21, representing the top of the dried felt-side grit and fiber slurry 20, and a bottom side 23, representing the bottom of the wire side fiber-only base paper 18. In a wear resistant paper 22 produced by this process, the bottom side 23 is the one that is preferred for printing on due to the smooth and flat nature of that side of the overlay 22.

Figure 3:
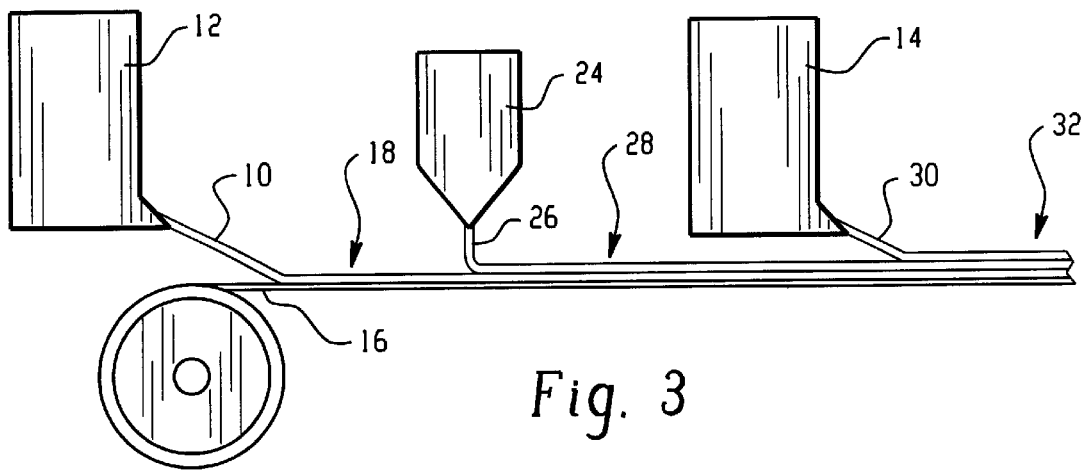
FIG. 3 is a schematic diagram of a papermaking process for use in accordance with an embodiment of the method of the present invention wherein the grit is deposited on the base paper web through a slot orifice coater and a discrete fiber layer is deposited over the grit through a secondary headbox.

As best shown in FIG. 3, an alternate preferred method for producing paper for use in wear-resistant laminates in accordance with the present invention involves using two headboxes, a primary headbox 12 and a secondary headbox 14, and a grit deposition coater 24. While the grit deposition coater could be a headbox or other coating method as known in the art, the grit deposition coater is preferably a slot orifice coater. The term "slot orifice coater" as used herein is used in the same manner it is used in the art, namely, to designate a coater having a central cavity which opens on and feeds a slot through which the coating is forced under pressure. Examples of slot orifice coaters useful in the present invention include curtain coaters in which the overlay is coated as it passes through a falling curtain of the coating composition and coaters in which the overlay is coated as it contacts a bead of the coating composition as it is extruded from a slot orifice. The latter type coaters can be oriented to coat the substrate as it passes directly above the coater, directly below the coater or to the side of the coater. The slot width of the slot orifice coaters used in the process typically range from 0.4 to 0.8 mm. The gap height (i.e., the distance between the edge of the slot orifice and the substrate surface) is about 0.5 to 1.55 mm when coating form a bead and about 2.5 to 25 mm when coating form a curtain. The coating head pressure is about 5 to 25 psig when coating form a bead and about 5 to 150 psig when coating from a curtain. A slot orifice coater useful in the present invention is sold by Liberty Tool Corp. under the trade name Technikote. Other manufacturers also make slot orifice coaters useful herein.

In this embodiment, the paper slurry 10 is initially deposited on the wire 16 through the primary headbox 12 to form the base paper 18 as is known in the art. Next, a slurry of grit 26 of a composition as described above is deposited on the base paper 10 through grit deposition coater 24 to form an intermediate wear resistant overlay paper 28. Finally, a slurry of fiber 30 of a composition as described above is deposited over the grit 26 to form a discrete "top" or "felt-side" fiber layer thereby forming the complete composition of the final wear resistant overlay 32 in accordance with the present invention. As with the embodiment described above, it is preferred that the secondary headbox 14 be positioned as far from the primary headbox 12 as possible and that the grit deposition coater 24 be positioned equidistant from the headboxes 12, 14 in order to help insure that all three layers of the wear resistant overlay paper 32 are separated and intermix as little as possible. After the felt-side fiber slurry 30 is deposited over the grit 26, the wear resistant overlay 32 is dried and prepared for shipping as is known in the art. At this point in time, if desired, the wear resistant overlay 32 may be subjected to an otherwise standard printing or coating process (not shown) to print a desired decor on the paper thereby eliminating the need for the decor sheet in the finished laminate.

Figure 4:
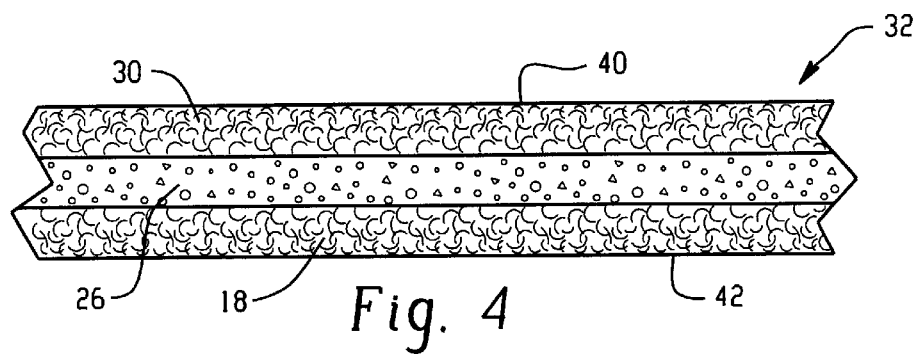
FIG. 4 is a cross-sectional view of a wear resistant overlay paper made using the method shown in FIG. 3.

As shown best in FIG. 4, the wear resistant overlay 32 as produced above may have a top side 40, representing the top of the dried felt-side fiber-only slurry 30 and a bottom side 42, representing the bottom of the wire side fiber-only base paper 18. In this embodiment, either one of the top side 40 or the bottom side 42 of the wear resistant overlay 32 produced by the process described above may be printed or coated on in accordance with the present invention.

As mentioned above, other embodiments of the present invention involve the addition of a discrete layer of microcrystalline cellulose over either the base sheet, the grit slurry (or grit slurry/fiber combination) or over the second fibrous layer. In yet another embodiment of the present invention, a three layer wear resistant overlay paper may be made by using a specially designed single headbox that applies the discrete layers on an inclined wire. In this single headbox addition method, each of the three slurries (first and second cellulosic fiber slurries and the grit slurry) are deposited on the inclined web separately in discrete layers from separate holding areas using a single headbox.

Figure 5:
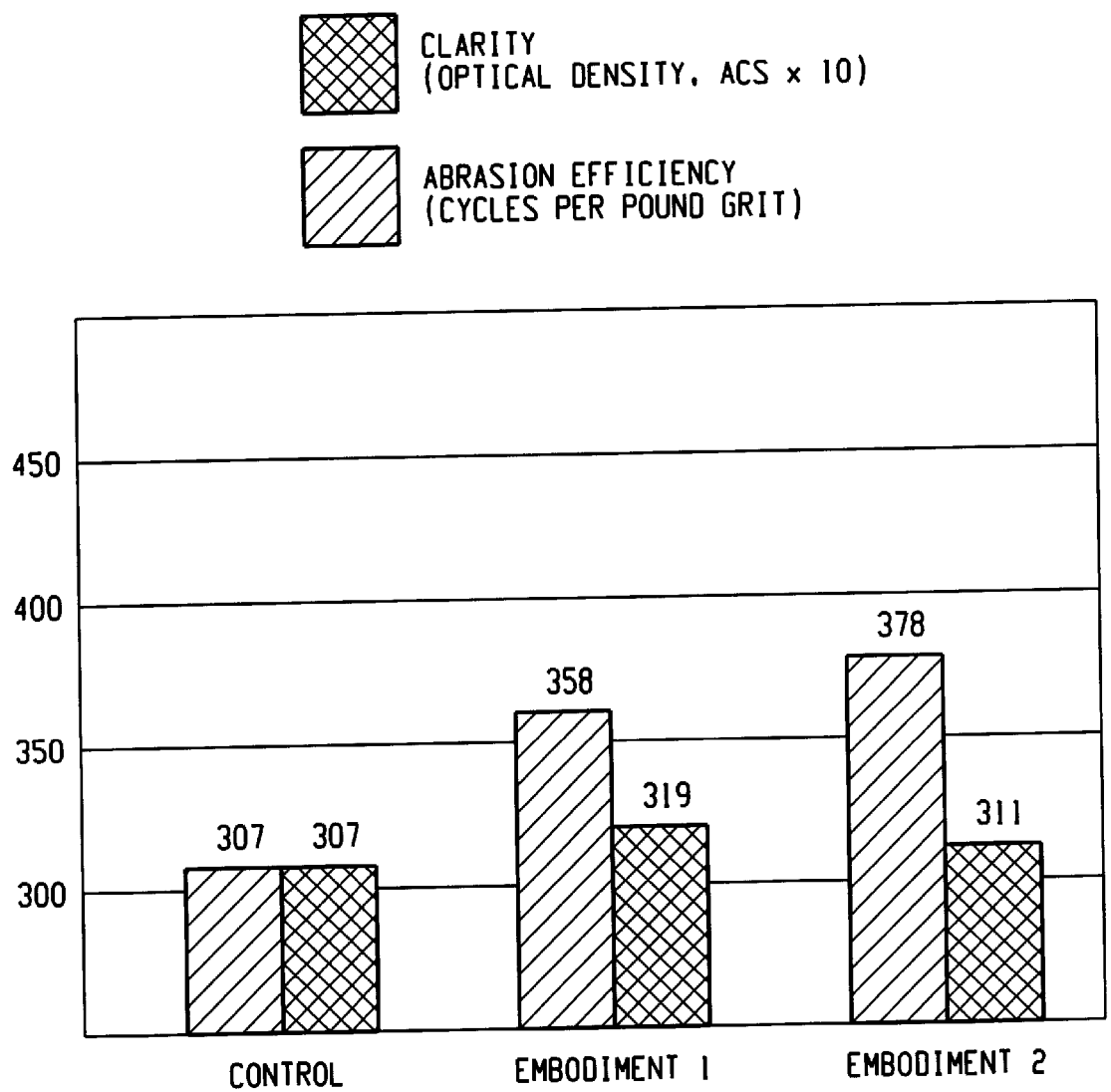
FIG. 5 is a chart showing the improved properties of a laminate made incorporating the wear resistant overlay papers of the present invention.

The improved characteristics of wear resistant overlay papers made by the process described herein can best be seen in FIG. 5. Specifically, the chart in FIG. 5 shows the results of clarity and abrasion resistance tests performed on the wire (or bottom) side, the side which would be facing up in a finished wear resistant decorative laminate, of three different wear resistant papers. The tested control paper was a wear resistant overlay paper made using the prior art process wherein the grit was added to the base paper at the wet end and no additional fiber was used. The tested embodiment 1 paper was a wear resistant overlay paper made in accordance with the present invention wherein additional paper fiber was added to the grit to form a slurry that was added to the base paper using a secondary headbox. The tested embodiment 2 paper was a wear resistant overlay paper made in accordance with the present invention wherein discreet layers of grit slurry and paper fiber were added over the base paper. The layer of grit slurry was added using a secondary headbox and a layer of fiber was deposited over the grit slurry using a third headbox. For all papers tested, results for clarity are presented as the average L value from a spectrophotometer (in this case an Applied Color Systems spectrophotometer, Model No. CS-5) from four readings times a multiplier of 10. The abrasion efficiency was evaluated using abrasion cycles divided by pounds of grit in the paper per 3000 square feet. As can be seen from the chart, all three embodiments showed similar numbers for clarity, with the control paper exhibiting the best clarity and the embodiment 1 paper exhibiting the worst. However, all three clarity readings were deemed "acceptable" for use in wear resistant decorative laminates. With respect to abrasion efficiency, both embodiments as disclosed in the present invention exhibited greatly improved abrasion efficiency when compared to the prior art control paper.

Having described the invention in detail, it will be apparent that modifications and variations are possible without departing from the scope of the invention defined in the appended claims:

What is claimed is:

1. A method for forming an abrasion resistant paper sheet for use in decorative laminates comprising the steps of:
   mixing cellulosic, fibrous feedstock and water to form a first cellulosic slurry;
   depositing said first cellulosic slurry onto a wire of a papermaking machine to form a base paper web;
   mixing encapsulated or non-encapsulated particles with water to form a grit slurry;
   depositing said grit slurry on said base paper web;
   mixing cellulosic, fibrous feedstock and water to form a second cellulosic slurry;
   depositing said second cellulosic slurry onto said grit slurry at a sufficient distance from the deposition position of said grit slurry and the deposition position of said first cellulosic slurry so that said second cellulosic slurry forms a discrete fiber layer on top of the two previously deposited layers thereby forming a wear resistant paper product having three discrete layers; and
   printing or coating a desired pattern on a top (felt) side or bottom (wire) side of said wear resistant paper product.

2. The method of claim 1 wherein said first cellulosic slurry, said grit slurry and said second cellulosic slurry are deposited on said wire, said base paper web, and said grit slurry, respectively, through headboxes and slot orifice coaters that are positioned at equidistant distances from each other and wherein such distances are maximized.

3. The method of claim 1 wherein said grit slurry includes grit particles comprised of aluminum oxide particles.

4. The method of claim 1 wherein said grit slurry includes grit particles comprised of aluminum oxide particles microencapsulated in melamine-formaldehyde resin.

5. The method of claim 1 wherein said grit slurry includes a mixture of encapsulated and non-encapsulated grit particles.

6. The method of claim 1 wherein a layer of microcrystalline cellulose is deposited on said grit slurry before deposition of said second cellulosic slurry.

7. The method of claim 1 wherein said printing is on said top (felt) side of said wear resistant paper product and said wear resistant paper product is incorporated in a laminate with said top (felt) side facing downward.

8. A method for forming an abrasion resistant paper sheet for use in decorative laminates comprising the steps of:
   mixing cellulosic, fibrous feedstock and water to form a first cellulosic slurry;
   depositing said first cellulosic slurry onto a wire of a papermaking machine to form a base paper web;

mixing encapsulated particles with water to form a grit slurry;

depositing said grit slurry on said base paper web;

mixing cellulosic, fibrous feedstock and water to form a second cellulosic slurry;

depositing said second cellulosic slurry onto said grit slurry at a sufficient distance from the deposition position of said grit slurry and the deposition position of said first cellulosic slurry so that said second cellulosic slurry forms a discrete fiber layer on top of the two previously deposited layers thereby forming a wear resistant paper product having three discrete layers; and printing or coating a desired pattern on a top (felt) side or bottom (wire) side of said wear resistant paper product.

9. The method of claim 8 wherein said first cellulosic slurry, said grit slurry and said second cellulosic slurry are deposited on said wire, said base paper web, and said grit slurry, respectively, through headboxes and slot orifice coaters that are positioned at equidistant distances from each other and wherein such distances are maximized.

10. The method of claim 8 wherein said grit slurry includes grit particles comprised of melamine-formaldehyde encapsulated aluminum oxide particles.

11. The method of claim 8 wherein a layer of microcrystalline cellulose is deposited on said grit slurry before deposition of said second cellulosic slurry.

12. The method of claim 8 wherein said printing is on said top (felt) side of said wear resistant paper product and said wear resistant paper product is incorporated in a laminate with said top (felt) side facing downward.

* * * * *